United States Patent
Hamada et al.

(10) Patent No.: US 9,137,322 B2
(45) Date of Patent: *Sep. 15, 2015

(54) SYSTEM AND METHOD FOR PROVIDING ELECTRONIC CONTENT

(71) Applicant: DeNA Co., Ltd., Tokyo (JP)

(72) Inventors: Koichi Hamada, Tokyo (JP); Toshiharu Kuroki, Tokyo (JP); Takahide Kimura, Tokyo (JP); Katsura Kiriyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/083,156

(22) Filed: Nov. 18, 2013

(65) Prior Publication Data

US 2015/0127731 A1    May 7, 2015

(30) Foreign Application Priority Data

Nov. 5, 2013 (JP) ................................ 2013-229611

(51) Int. Cl.
*G06F 15/16* (2006.01)
*H04L 29/08* (2006.01)

(52) U.S. Cl.
CPC ................ *H04L 67/22* (2013.01); *H04L 29/08* (2013.01)

(58) Field of Classification Search
USPC ........................................................ 709/204
See application file for complete search history.

(56) References Cited

U.S. PATENT DOCUMENTS

| 8,849,721 B2 | 9/2014 | Fedorov et al. |
| 2009/0062010 A1 | 3/2009 | Iwata et al. |

(Continued)

FOREIGN PATENT DOCUMENTS

| JP | 2003-157375 | 5/2003 |
| JP | 2006-309660 | 11/2006 |

(Continued)

OTHER PUBLICATIONS

Japanese Office Action mailed on Dec. 17, 2013 in Japanese Patent Application No. 2013-229611 and English translation.

(Continued)

*Primary Examiner* — Tauqir Hussain
(74) *Attorney, Agent, or Firm* — Pillsbury Winthrop Shaw Pittman LLP

(57) ABSTRACT

The system according to an embodiment of the present invention may more appropriately provide recommendation information of contents based on use status of the contents by a plurality of users. The system includes a service provision control unit for controlling provision of services, an information storage unit for storing information, a recommended content selection unit for selecting recommended games based on closeness information between the users and use degree information by the users for each game, a recommended content information sending unit for sending content recommendation information including information specifying recommended games, a recommended user selection unit for selecting recommended users based on the use degree information, a recommended user information sending unit for user recommendation information including information specifying the recommended users, and a relationship request information sending unit for sending relationship request information in response to a request for setting a friend with the recommended users.

6 Claims, 10 Drawing Sheets

(56) References Cited

U.S. PATENT DOCUMENTS

| | | |
|---|---|---|
| 2009/0197681 A1 | 8/2009 | Krishnamoorthy et al. |
| 2011/0238755 A1* | 9/2011 | Khan et al. .................... 709/204 |
| 2012/0166578 A1 | 6/2012 | Hong ........................... 709/217 |
| 2013/0036081 A1 | 2/2013 | Tateno |
| 2013/0073473 A1* | 3/2013 | Heath ........................... 705/319 |
| 2013/0073618 A1 | 3/2013 | Takamura et al. |
| 2013/0080549 A1 | 3/2013 | Watanabe et al. |
| 2013/0132491 A1 | 5/2013 | Watanabe et al. |
| 2013/0297608 A1* | 11/2013 | Etoh et al. .................... 707/737 |
| 2014/0006505 A1 | 1/2014 | Rao et al. |
| 2014/0337427 A1 | 11/2014 | Hamada et al. |

FOREIGN PATENT DOCUMENTS

| | | |
|---|---|---|
| JP | 2008-191768 | 8/2008 |
| JP | 2011-511981 | 4/2011 |
| JP | 2011-257916 | 12/2011 |
| JP | 2012-141971 | 7/2012 |
| JP | 2013-033376 | 2/2013 |
| WO | 2011-152420 | 12/2011 |
| WO | 2013/121470 | 8/2013 |

OTHER PUBLICATIONS

Japanese Office Action in connection with Japanese Patent Application No. 2013-097946 issued on Sep. 3, 2013.

Japanese Office Action in connection with Japanese Patent Application No. 2013-097946 issued on Oct. 29, 2013.

Statement of Certificate of Exception to Lack of Novelty for Japanese Patent Application No. 2013-097946 dated May 16, 2013.

* cited by examiner

User-to-user Relationship
Management Table 52a

| User ID 1 |
| --- |
| User ID 2 |
| Relationship |
| ... |

Fig. 4

Communication
Management Table 52b

| User ID 1 |
| --- |
| User ID 2 |
| Communication Means |
| Number of Times |
| ... |

Fig. 5

Content Use
Management Table 52c

| User ID |
| --- |
| Game ID |
| Number of Logins |
| Number of Consecutive Login Days |
| Use Time |
| Number of Obtained Special Items |
| Use Start Time |
| ... |

Fig. 6

Recommended Content
Management Table 52d

| Used ID |
| --- |
| Recommended Game ID |
| Introduced User ID |
| Connection |
| Closeness |
| Degree of Use |
| ... |

Fig. 7

Recommended User
Management Table 52e

| User ID |
| --- |
| Recommended User ID |
| Introduced Game ID |
| Degree of Use |
| ... |

SYSTEM AND METHOD FOR PROVIDING ELECTRONIC CONTENT

CROSS-REFERENCE TO RELATED APPLICATIONS

This application is based on and claims the benefit of priority from Japanese Patent Application Serial No. 2013-229611 (filed on Nov. 5, 2013), the contents of which are hereby incorporated by reference in their entirety.

TECHNICAL FIELD

The present invention relates to a system and method for providing electronic contents, and in particular to a system and method for providing a plurality of electronic contents to a plurality of users each operating a respective terminal device communicatively connected.

BACKGROUND

Conventionally proposed such systems include a system aimed at recommending contents that fit preferences of individual users (see, e.g., Japanese Patent Application Publication No. 2008-191768). In this system, recommendation information on contents is exchanged between users in a SNS-based network group formed in accordance with preferences of users, such that the users can obtain recommendation information on contents that fit their own preferences.

SUMMARY

Unfortunately, in such a system, contents are only recommended through information exchanged between the users; therefore, the actual use status by each user may not be reflected on the recommendation. For example, when users use highly common contents, it is highly likely that the content used by one of the users fits preference of the other user; however, such a content is not always recommended. Further, even if a setup for recommending a content based on actual use status of contents is installed in such a system, such use status is only related to users participating an SNS network group; therefore, if the number of participating users is insufficient, contents may be recommended in a small number or with a poor accuracy (fitness of preference).

One object of the embodiments of the present invention is to more appropriately provide recommendation information of contents based on use status of the contents by a plurality of users. Other objects of the present disclosure will be apparent with reference to the entire description in this specification.

The server according to an embodiment of the present invention is a system for providing a plurality of electronic contents to a plurality of users each operating a respective terminal device communicatively connected to the system, the system comprising: an information storage unit configured to store at least closeness information specifying closeness between the plurality of users and use degree information specifying degree of use of each of the plurality of electronic contents by each of the plurality of users; and one or more computer processors configured to execute a particular program, wherein the particular program comprises: a recommended content selection module configured to select one or more electronic contents to be recommended to one user from the plurality of electronic contents based at least on the closeness information and the use degree information; a recommended content information sending module configured to send, to the terminal device operated by the one user, content recommendation information including information specifying the recommended electronic contents; a recommended user selection module configured to select one or more other users to be recommended to the one user from the plurality of users based at least on the use degree information; and a recommended user information sending module configured to send, to the terminal device operated by the one user, user recommendation information including information specifying the recommended other users. The "closeness" may refer to the degree of closeness and may include information of any mode indicating the degree of closeness in two of more levels. For example, closeness may include information indicating whether two users are "close" or "not close." The "degree of use" may refer to the degree of use and may include information of any mode indicating the degree of use in two or more levels. For example, degree of use may include information indication whether a user "uses" or "does not use" a content. Further, "electronic contents recommended to the user" may include both the mode where use of electronic contents yet to be used by the user is recommended and the mode where the use of electronic contents already used by the user is recommended. Also, "electronic contents" may include online games, electronic books, video contents, and music contents.

The method according to an embodiment of the present invention is a method using one or more computers for providing a plurality of electronic contents to a plurality of users each operating a respective terminal device communicatively connected, the system comprising: storing at least closeness information specifying closeness between the plurality of users and use degree information specifying degree of use of each of the plurality of electronic contents by each of the plurality of users; selecting one or more electronic contents to be recommended to one user from the plurality of electronic contents based at least on the closeness information and the use degree information; sending, to the terminal device operated by the one user, content recommendation information including information specifying the recommended electronic contents; selecting one or more other users to be recommended to the one user from the plurality of users based at least on the use degree information; and sending, to the terminal device operated by the one user, user recommendation information including information specifying the recommended other users.

Various embodiments of the present invention may more appropriately provide recommendation information of contents based on use status of the contents by a plurality of users.

BRIEF DESCRIPTION OF THE DRAWINGS

FIG. 4 is a diagram showing an example of information managed by a user-to-user relationship management table according to an embodiment.

FIG. 5 is a diagram showing an example of information managed by a communication management table according to an embodiment.

FIG. 6 is a diagram showing an example of information managed by a content use management table according to an embodiment.

FIG. 7 is a diagram showing an example of information managed by a recommended content management table according to an embodiment.

DESCRIPTION OF EXAMPLE EMBODIMENTS

Figure 1:
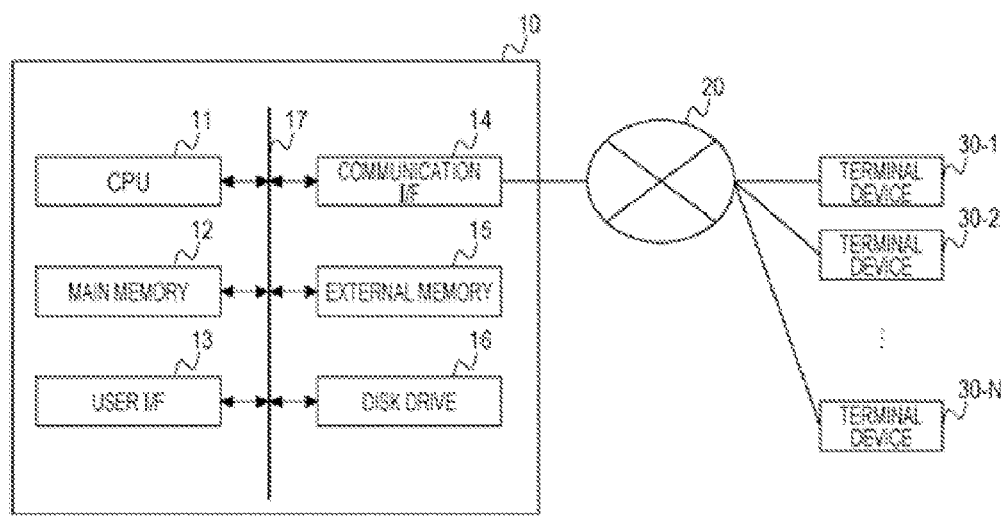
FIG. 1 is a block diagram schematically illustrating a network configuration of a system according to an embodiment of the present invention.

Various embodiments of the present invention will be described hereinafter with reference to the drawings. In the drawings, the same components are denoted by the same reference numerals.

FIG. 1 is a block diagram schematically illustrating a network configuration including a system 10 according to an embodiment of the present invention. As illustrated in FIG. 1, the system 10 according to an embodiment may be communicatively connected to a plurality of terminal devices 30-1, 30-2, . . . , and 30-N (hereinafter also collectively referred to as the "terminal devices 30"), each having a communication function, via a communication network 20 such as the Internet. The system 10 may serve as a communication platform (SNS platform) for providing users operating the terminal devices 30 with various electronic contents including online games, electronic books, video contents, and music contents and for implementing various user-to-user communication (particular communication) such as chat (mini mail), circle, avatar, diary, message board, greeting, telephone call, etc.

As illustrated in FIG. 1, the system 10 according to an embodiment may include a central processing unit (CPU) (computer processor) 11, a main memory 12, a user interface (I/F) 13, a communication I/F 14, an external memory 15, and a disk drive 16, and these components may be electrically connected to one another via a bus 17. The CPU 11 may load an operating system and various programs into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store a control program for controlling provision of various services such as games. The external memory 15 may also store various data used in the various services. The various data that may be stored in the external memory 15 may also be stored on a database server communicatively connected to the system 10 and physically separate from the system 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, applications stored in a storage medium and various data for use in the various services may be read by the disk drive 16, and may be installed into the external memory 15.

In an embodiment, the system 10 may be a web server for managing a web site including a plurality of hierarchical web pages and may be capable of providing the terminal devices 30 with various services such as various games, SNS, music distribution, and call/message exchange. The terminal devices 30 may fetch HTML data for rendering a web page from the system 10 and analyze the fetched HTML data to present the web page to a user of the terminal devices 30. A game provided through such a web page is sometimes called a browser game. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store applications to be executed on execution environments of the terminal device 30 other than browser software. These applications may include programs for receiving services and various data such as image data to be referred to for executing the programs. The programs may be created in, for example, object oriented languages such as Objective-C™ and Java™. The created programs may be stored on the external memory 15 in the form of application software along with various data. The application software stored on the external memory 15 may be delivered to a terminal device 30 in response to a delivery request. The application software delivered from the system 10 may be received by the terminal device 30 through a communication I/F 34 in accordance with the control of CPU 31; the received programs may be sent to an external memory 35 and stored thereon. The application software may be launched in accordance with the user's operation on the terminal device 30 and may be executed on an execution environment implemented on the terminal device 30 such as NgCore™ or Android™. The system 10 may provide the applications executed on the terminal devices 30 with various data required for providing services. Additionally, the system 10 can store various data sent from the terminal device 30 for each user, thereby managing the state of provided services (e.g., the progression of the game) for each user.

Thus, the system 10 may manage the web site for providing various services and deliver web pages constituting the web site in response to a request from the terminal device 30, thereby providing a service to a user. Also, the system 10 can provide services based on communication with an application performed on the terminal device 30 in place of, or in addition to, such browser-based services. Whichever mode may be taken to provide the services, the system 10 can store data required to provide the services for each identification identifying a user. Briefly, the system 10 may also include a function to authenticate a user at start of provision of services and perform charging process in accordance with provision of services. The games provided by the system 10 may include desired games such as action games, role playing games, interactive baseball games, and card games. The types of the games implemented by the system 10 are not limited to those explicitly disclosed herein.

In an embodiment, the terminal device 30 may be any information processing device that may display on a web browser a web page of a game web site for providing services obtained from the system 10 and include an executing environment for executing applications; and the terminal devices 30 may include smartphones, tablet terminals, and game-dedicated terminals.

Figure 2:
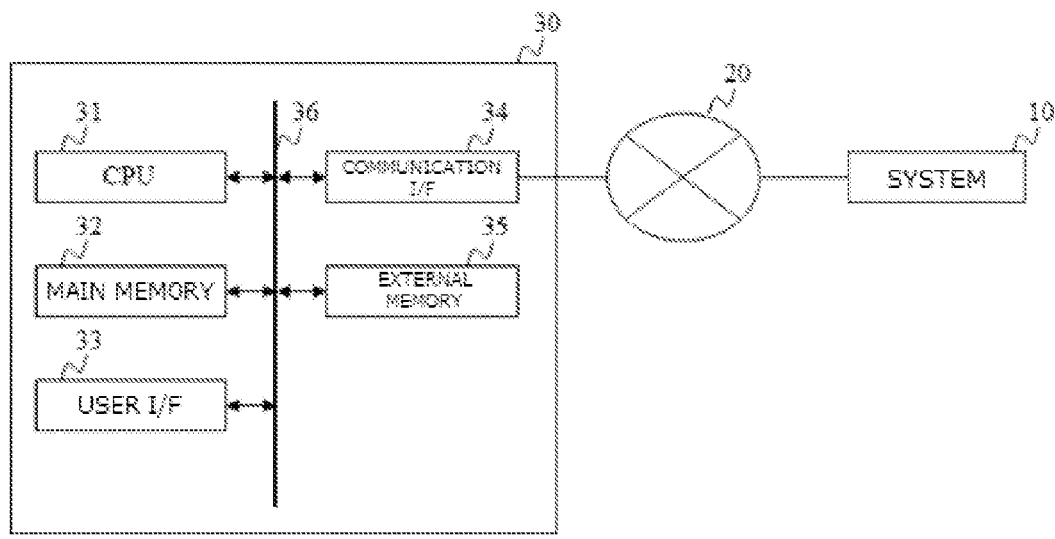
FIG. 2 is a block diagram schematically illustrating the architecture of a terminal device according to an embodiment.

The architecture of the terminal device 30 will now be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the system 10 via the communication network 20.

The external memory 35 may comprise, for example, a magnetic disk drive or a flash memory and store various programs such as an operating system. When receiving an application from a system 10 via the communication I/F 34, the external memory 35 may store the received application.

A terminal device 30 having such an architecture may include, for example, browser software for interpreting an HTML file (HTML data) and rendering a screen; this browser software may enable the terminal device 30 to interpret the HTML data fetched from the system 10 and render web pages corresponding to the received HTML data. Further, the terminal device 30 may include plug-in software (e.g., Flash Player distributed by Adobe Systems Incorporated) embedded into browser software; therefore, the terminal device 30 can fetch from the system 10 a SWF file embedded in HTML data and execute the SWF file by using the browser software and the plug-in software.

When a service is received on the terminal device 30, for example, animation or an operation icon designated by the program may be displayed on a screen of the terminal device 30. The user may enter an instruction for receiving the service using an input interface of the terminal device 30. The instruction entered by the user may be transmitted to the system 10 through the browser of the terminal device 30 or a function of an execution environment such as NgCore™.

Figure 3:
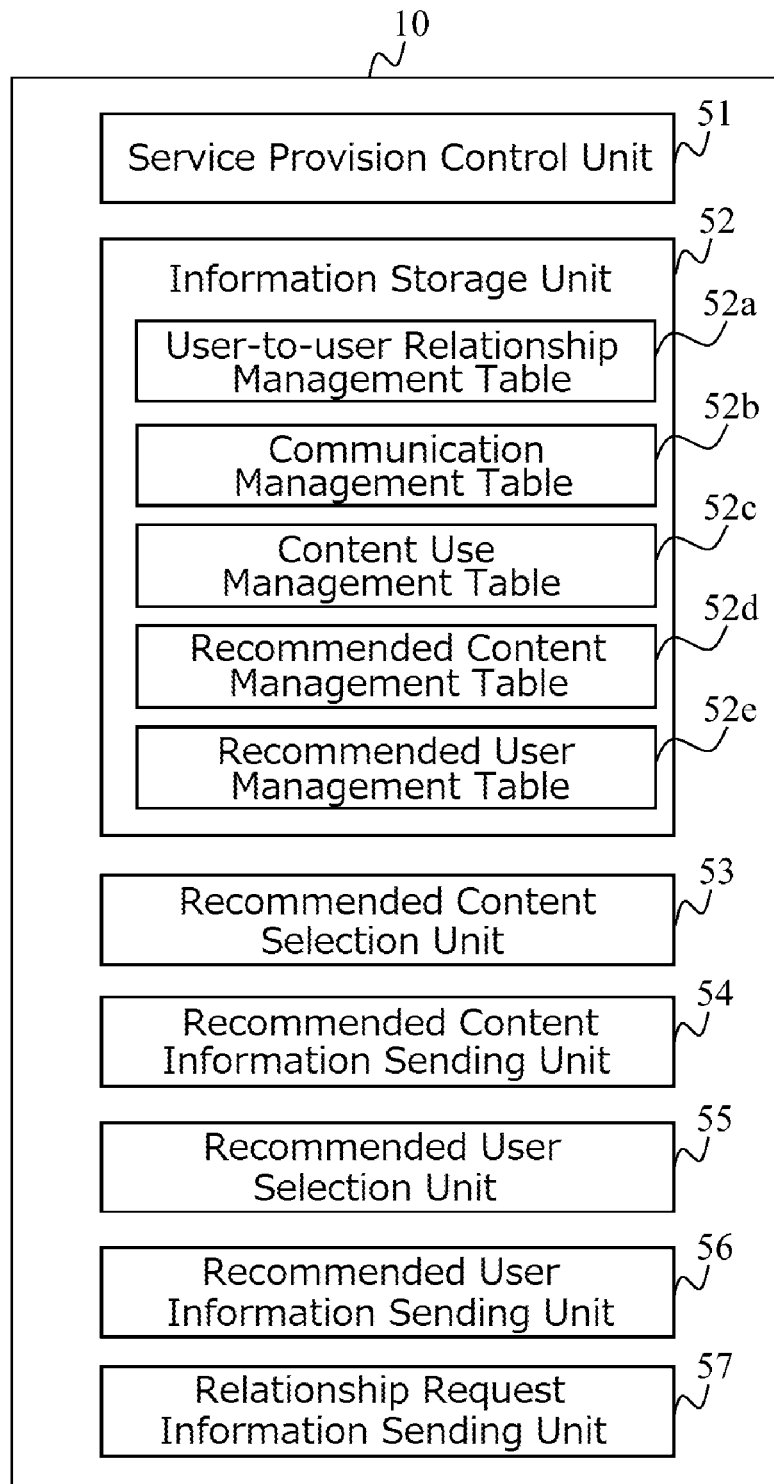
FIG. 3 is a block diagram illustrating the functionality of the system according to an embodiment.

Next, the functionality of the system 10 implemented by the components shown in FIG. 1 will now be described. As described above, the system 10, which can provide various services including provision of electronic contents, will now be described with a focus on functions related to online games as electronic contents. Online games are examples suitable for description of an embodiment of the present invention. FIG. 3 is a block diagram illustrating the functionality of a system 10 according to an embodiment of the present invention. As shown, the system 10 may comprise: a service provision control unit 51 for controlling provision of services such as progress of games; an information storage unit 52 for storing information; a recommended content selection unit 53 for selecting a recommended game to be recommended to the user from a plurality of games and selecting one or more introduced users (other users) to be introduced as users using the recommended game from a plurality of users, based at least on closeness information between a plurality of users and use degree information of games (electronic contents) by the users; a recommended content information sending unit 54 for sending, to the terminal device 30 operated by the user, content recommendation information including information specifying the recommended game and information specifying the introduced users; a recommended user selection unit 55 for selecting recommended users (other users) to be recommended to the user from a plurality of users and selecting, from a plurality of games, one or more introduced games to be introduced as games used by both the user and the recommended users based at least on information on degree of use by the user for each game; a recommended user information sending unit 56 for sending, to the terminal device 30 operated by the user, user recommendation information including information specifying recommended users and information specifying introduced games; and a relationship request information sending unit 57 for sending, in response to a setting request of a friend (a particular relationship) with a recommended user from a user, relationship request information including information specifying the user and information specifying introduced games, to the terminal device 30 operated by the recommended user. These functions may be implemented through cooperation between the CPU 11 of the system 10 and various programs, tables, and the like stored in the main memory 12 and the external memory 15. For example, these functions may be implemented when CPU 11, a computer processor, executes a program including at least a part of modules corresponding to the functions of the service provision control unit 51, recommended content selection unit 53, recommended content information sending unit 54, recommended user selection unit 55, recommended user information sending unit 56, and relationship request information sending unit 57.

The service provision control unit 51 may send and receive various data required for providing services such as the progression of various games to and from the terminal device 30 and manage such data for each user, thereby controlling provision of the services for each user. For example, the service provision control unit 51 can sequentially display, on the terminal device 30, web pages constituting a web site for providing services in response to a request from the terminal device 30. When a hyperlink on the displayed web page is selected by the user, the service provision control unit 51 may send new HTML data corresponding to the hyperlink to the terminal device 30. The terminal device 30 may display a web page based on the new HTML data. Thus, the service provision control unit 51 may control the service such that web pages stored on the system 10 are sequentially provided to the terminal device 30 in accordance with the operation by the user; and the user can receive the service, or progress the game for example, by his own operation through the function of the service provision control unit 51.

When the terminal device 30 executes the game application, the service provision control unit 51 can send various data used in the game to the game application. For example, when receiving from a game application on the terminal device 30 a control signal indicating that a certain mission has been cleared, the service provision control unit 51 may provide the game application with various parameters related to a mission subsequent to the cleared mission. The game application may load the data provided by the system 10 and progress the game.

The terminal device 30 can appropriately send to the system 10 various information on progression of the game such as information indicating various parameter values used in the game (information on earned game points and earned items) and information indicating a status (information specifying a fulfilled mission), through the function of browser software or the game application. The service provision control unit 51 may store, for each user, information on the progression of the game received from a plurality of terminal devices 30, thereby controlling the progression of the game for each user. Thus, when the user logs in the system 10 using his own ID, the game may be resumed from the stage corresponding to the progression of the user (e.g., the stage where the game was interrupted) based on the information on the progression of the game associated with the user and stored in the system 10. The information required for the progression of the game may also be managed by various functions of the system 10 other than the service provision control unit 51.

The information storage unit 52 may include a user-to-user relationship management table 52a for managing information on relationship between users (user-to-user relationship information), a communication management table 52b for managing information on communication between users (communication information), a content use management table 52c for managing information on use of each game (electronic content) by each user, a recommended content management table 52d for managing information on games recommended to users, and a recommended user management table 52e for managing information on other users to be recommended to the users. FIG. 4 shows an example of information managed by the user-to-user relationship management table 52a. As shown, the user-to-user relationship management table 52a may manage information such as "relationship" representing the relationship between two users identified by the two user IDs ("user ID 1" and "user ID 2"). The values of the "relationship" in an embodiment may include "friend," a relationship formed when a user approves a friend application from another user, and "circle company," a relationship between users included in a same circle. The circle is one of the functions implemented by a communication platform provided by the system 10 wherein users mutually exchange information on a subject via a message board, etc. Further, in an embodiment, "friend" may be of various types, such as a friend of a type corresponding to an object service (e.g., a friend in a communication platform, a friend (company) in individual games such as game A, and a friend in musical content providing services). In an embodiment, friends and circle companies may be managed by the user-to-user relationship management table 52a; however, other tables may also be used to manage these information. As to "circle company" for example, a table for managing information on users may manage circles including the users; and based on this information, users included in a same circle may be specified.

FIG. 5 shows an example of information managed by the communication management table 52b. As shown, the communication management table 52b may include two user IDs ("user ID 1" and "user ID 2") and means (a service or function) for communication between users provided by the system 10 ("communication means"), and also manage, in association with combinations of these items, information such as "number of times" indicating the number of times of communication between the users using the communication means. In an embodiment, the values of "communication means" may include various communication means "chat (mini mail)," "circle," "avatar," "diary," "message board," "greeting," and "telephone call" and "display." The value "display" may refer to display of a user on another user's screen for receiving various services provided by the system 10; for example, a user is displayed on a screen used for an online game as a top level ranker of the game, as a candidate for an opponent in a battle, or as a candidate for a company to perform a cooperation play. Additionally, when the value of the "communication means" is "display," "number of times" contains the number of times of display of the user identified by "user ID 2" on the screen used by the user identified by "user ID 1" (that is, the degree of communication in which the user of the user ID 1 sees the user of the user ID 2 on the screen). When the "communication means" is "chat (mini mail)" or "telephone call" for example, "time" indicating the total time of communication may also be managed in place of, or in addition to, "number of times." Further, the values of the "communication means" may also include an action in a specific game (electronic content) such as "a battle in game D." In an embodiment, the information in the communication management table 52b may be updated by the service provision control unit 51 for each communication described above.

FIG. 6 shows an example of information managed by the content use management table 52c. As shown, the content use management table 52c may include "user ID" for identifying a user and "game ID" for identifying a game, and also manage, in association with combinations of these items, "number of logins" indicating the number of times when this user logged in this game, "number of consecutive login days" indicating the number of consecutive days when this user logged in this game, "use time" indicating the total use time of this game, "number of obtained special items" indicating the number of special items obtained in this game, and "use start time" indicating the date and time when use of this game was started. Additionally, the content use management table 52c may also manage information on games yet to be used (in this case, "number of logins," "number of consecutive login days," "use time," "number of obtained special items," and "use start time" may be blank).

FIG. 7 shows an example of information managed by the recommended content management table 52d. As shown, the recommended content management table 52d may include "user ID" for identifying a user, "recommended game ID" for identifying a game recommended to the user, and "introduced user ID" identifying an introduced user introduced as a user using the recommended game, and also manage, in association with combinations of these items, "connection" indicating the connection between the user and the introduced user, "closeness" indicating the closeness between the user and the introduced user, and "degree of use" indicating the degree of use of the recommended game by the introduced user. These information may be set by the recommended content selection unit 53 based on the information managed by the user-to-user relationship management table 52a, the communication management table 52b, and the content use management table 52c. This will be further descried later. One or more recommended games may be assigned to one user; or one or more introduced users may be assigned to a combination of one user and recommended games.

Figures 8, 9:
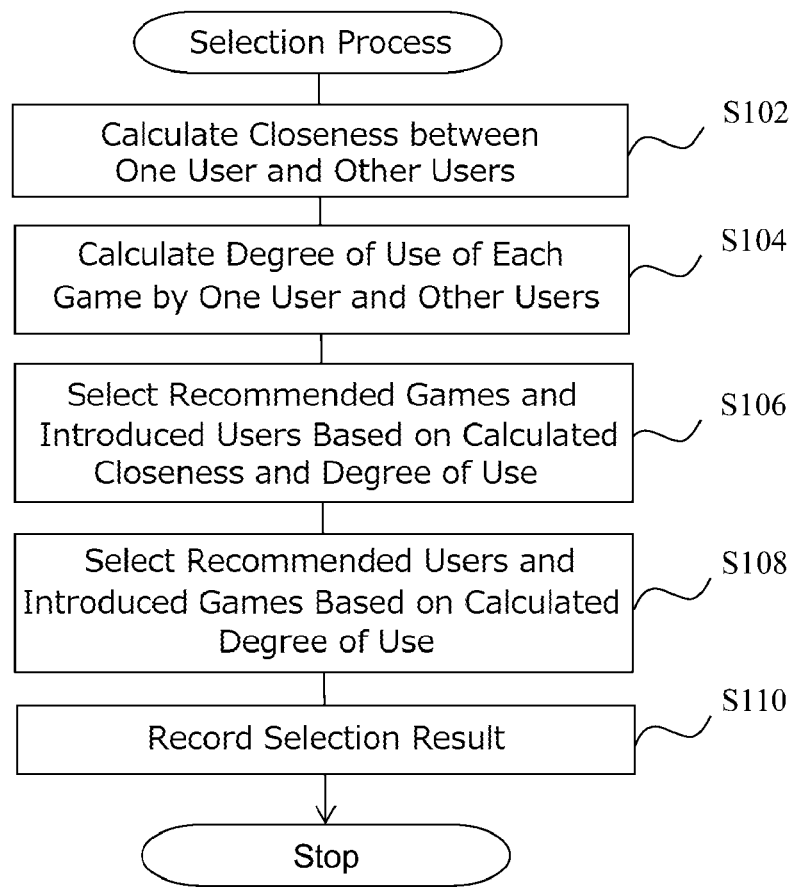
FIG. 8 is a diagram showing an example of information managed by a recommended user management table according to an embodiment.
FIG. 9 is a flow diagram showing an example of a selection process according to an embodiment.

FIG. 8 shows an example of information managed by the recommended user management table 52e. As shown, the recommended user management table 52e may manage information such as "user ID" identifying a user, "recommended user ID" identifying a recommended user to be recommended to the user, and "introduced game ID" containing a game ID of an introduced game introduced as a game used by both the user and the recommended user; additionally, the recommended user management table 52e may manage, in association with the above items, information such as "degree of use" indicating the degree of use of the introduced game by the recommended user. These information items may be set and stored by the selection unit 53 based on the information managed by the content use management table 52c. This will be further descried later. One or more recommended users may be assigned to one user; and one or more introduced games may be assigned to a combination of one user and recommended user.

Next, operations of such a system 10 as an embodiment of the present invention will now be described. FIG. 9 is a flow diagram showing an example of a selection process performed by the system 10 (the recommended content selection unit 53 and the recommended user selection unit 55). The selection process in an embodiment may be performed regularly (e.g., at one-hour intervals, or at 11 a.m. every day) in accordance with a predetermined schedule.

As shown, the first step of the selection process is to calculate closeness between users (step S102). In an embodiment, the closeness may be calculated based on information (closeness information) stored in the user-to-user relationship management table 52a and the communication management table 52b. The calculation may be performed by various methods. For example, the closeness may be calculated to be higher with the number of "relationships" between users (managed in the user-to-user relationship management table 52a) or with the number of times of communication between users (managed in the communication management table 52b). If the number of times of communication between users is used to calculate the closeness, the closeness between one user and another user may also be calculated to be higher with the proportion of the number of times of communication with the other user among the total number of times of communication by the one user (that is, with the occupancy among the total number of times of communication). It may also be possible that, for example, weighting is applied to calculation of the closeness in accordance with "relationship" between the users (e.g., weighting is applied such that "friend" impacts calculation of the closeness more than "circle company" or such that "friend in a communication platform" impacts calculation of the closeness more than "friend in each game"), or weighting is applied to calculation of the closeness in accordance with "communication means" of communication between users (e.g., weighting is applied such that "greeting" impacts calculation of the closeness more than "display"). Further, the calculated closeness may be in various forms, such as a number (e.g., 0 to 100 points), a rank (e.g., five level ranks represented by A to E), or a Boolean value indicating whether the users are "close" or "not close."

Next, the degree of use of each game is calculated for each user (step S104). In an embodiment, the degree of use may be calculated based on information (use degree information) managed by the content use management table 52c. The calculation may be performed by various methods. For example, the degree of use may be calculated to be higher with "number of logins," "number of consecutive login days," "use time," and "number of obtained special items." It may also be possible that, for example, weighting is applied to the values of "number of logins," "number of consecutive login days," "use time," and "number of obtained special items" (e.g., weighting may be applied such that "use time" impacts the calculation of the degree of use more than "number of logins"). Further, as with the closeness described above, the calculated degree of use may be in various forms, such as a number (e.g., 0 to 100 points), a rank (e.g., five level ranks represented by A to E), or a Boolean value indicating whether the users "use" or "not use" the game.

After calculating the closeness between users and the degree of use by each user, the system 10 may select recommended games to be recommended to each user and introduced users to be introduced as other users using the recommended games, based on the calculated closeness and degree of use (step S106). In an embodiment, recommended games and introduced users may be selected by various methods. For example, recommended games may be selected such that games used by other users (e.g., games used by other users at a degree of use higher than a predetermined threshold value), the other users having higher closeness with the one user (to which the recommended games are to be recommended), may be preferentially selected, or such that games used by a larger number of other users (or a larger number of other users having closeness with the one user higher than a predetermined threshold value) may be preferentially selected, or such that games used by other users at a higher degree of use may be preferentially selected. Also, for example, introduced users may be selected such that other users having higher closeness with the one user may be preferentially selected, or such that other users using the selected recommended games at a higher degree of use may be preferentially selected. The number of recommended games selected for one user may be any desirable number and is not limited. Additionally, the number of introduced users selected for one recommended game may be any desirable number and is not limited.

Next, the system 10 may select a recommended user to be recommended to the user and an introduced game to be introduced as a game used by both one user (the user receiving recommendation of the recommended user) and the recommended user (step S108). In an embodiment, a recommended user and introduced game may be selected by various methods. The selection of a recommended user may be performed such that, for example, among the other users, users using more games that are also used by the one user (e.g., a game used at a degree higher than a predetermined threshold value) are more preferentially selected, such that users using, at a higher degree of use, a game that is also used by the one user are more preferentially selected, or such that users using a game that is also used by the one user at a higher degree of use are more preferentially selected. Further, an introduced game may be selected such that, for example, among the games used by both the one user and the other users, games used by the one user at a higher degree of use are more preferentially selected, such that games used by the other users at a higher degree of use are more preferentially selected, or such that games released more recently are more preferentially selected. The number of recommended users selected for one user may be any desirable number and is not limited. Additionally, the number of introduced games selected for one recommended user may be any desirable number and is not limited.

Next, the system 10 may record the selection result of the recommended game and the introduced user corresponding thereto and the recommended user and the introduced game corresponding thereto (step S110) and end the selection process. The selection result of the recommended game and introduced user may be stored in the recommended content management table 52*d*; and more specifically, the recommended content management table 52*d* may store the "user ID" of the one user, the game ID (recommended game ID) of the game selected as a recommended game for the user, the user ID of the user selected as an introduced user for the recommended game ("introduced user ID"), the "connection" between the user and the introduced user, the "closeness" between the user and the introduced user, and the "degree of use" of the recommended game by the introduced user. The "connection" may be one of information items on the introduced user to be displayed on a screen containing information related to the recommended game (described later), and may be set, in an embodiment, based on information managed by the user-to-user relationship management table 52*a* and the communication management table 52*b*. This will be further descried later. The selection result of the recommended user and introduced game may be stored in the recommended user management table 52*e*; and more specifically, the recommended user management table 52*e* may store the "user ID" of the one user, the user ID of the user selected as a recommended user for the user ("recommended user ID"), the game ID of the game selected as an introduced game for the recommended user ("introduced game ID"), and the "degree of use" of the introduced game by the recommended user.

Figure 10:
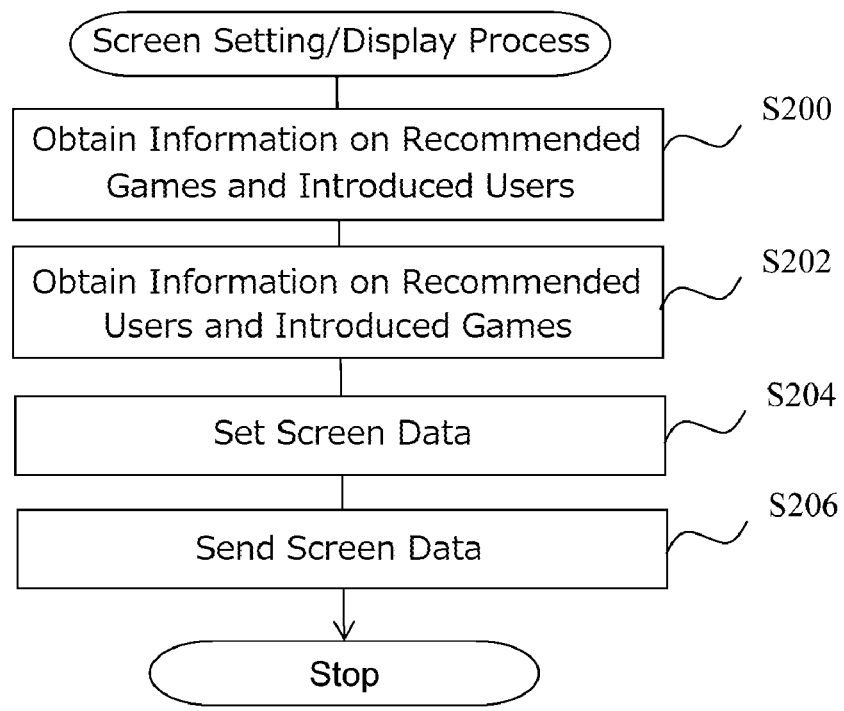
FIG. 10 is a flow diagram showing an example of a screen setting/display process according to an embodiment.

The above was description about operation concerning selection of a recommended game and a recommended user. Next, operation of setting and display of a screen containing information on the recommended games and/or the introduced users will now be described. FIG. 10 is a flow diagram showing an example of a screen setting/display process performed by the system 10 (the recommended content information sending unit 54 and the recommended user information sending unit 56). The screen setting/display process may be performed when a display request for the screen containing information on the recommended games and/or recommended user is received from a terminal device 30. In an embodiment, the screen containing information on the recommended games and/or recommended user may include various screens provided by the system 10 that may contain information on recommended games and recommended users, such as My Page screen from which users start using various services provided by the system 10, My Game screen from which users start playing various games, and Friend List screen for displaying a list of other users with which the user have a relationship of friends.

As shown, the first step of the screen setting/display process may be to obtain, from the recommended content management table 52*d*, information on recommended games for the user operating the terminal device 30 that made the display request for the screen (step S200). More specifically, the system 10 may search the recommended content management table 52*d* with the "user ID" of the user operating the terminal device 30 and obtain information such as the "recommended game ID," "introduced user ID," "connection," "closeness," and "degree of use" stored in the retrieved record.

The next step may be to obtain information on recommended users corresponding to the user operating the terminal device 30 from the recommended user management table 52*e* (step S202). More specifically, the system 10 may search the recommended user management table 52*e* with the "user ID" of the user operating the terminal device 30 and obtain information such as the "recommended user ID," "introduced game ID," and "degree of use" stored in the retrieved record.

Figure 11:
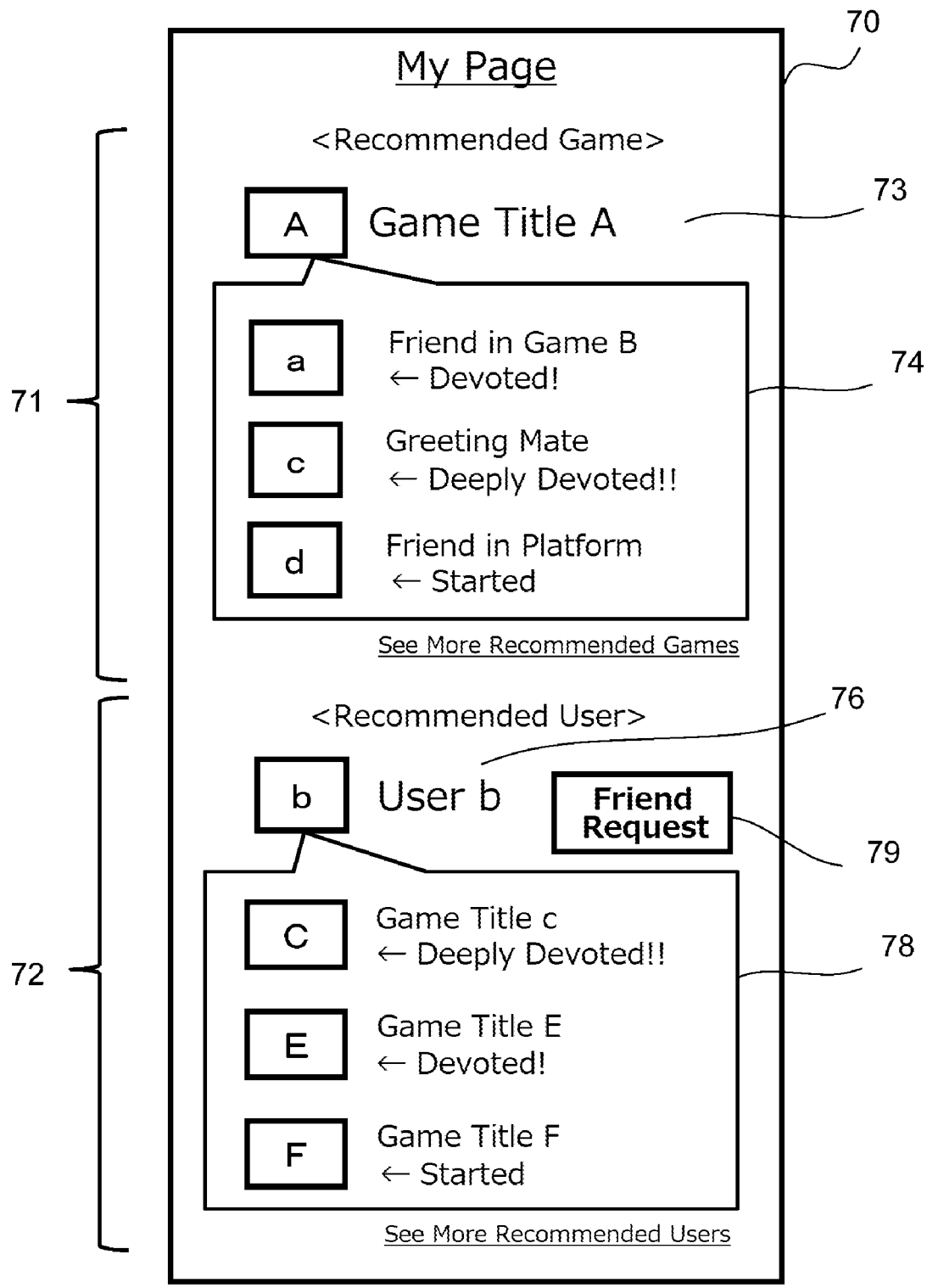
FIG. 11 is a diagram showing an example of My Page screen according to an embodiment.

The next step may be to set the screen data of a screen to be sent based on the retrieved information (step S204), send the set screen data to the terminal device 30 (step S206), and end the screen setting/display process. FIG. 11 is a diagram showing an example of My Page screen 70 as a screen displayed on the terminal device 30 that has received the screen data sent in step S206. As described above, My Page screen 70 may be a screen for users to start using various services and comprises, as shown, a game recommendation area 71 in the upper portion of the screen for recommending games and a user recommendation area 72 in the lower portion of the screen for recommending other users. As shown, the game recommendation area 71 may contain a recommended game information display section 73 for displaying information on a recommended game, and an introduced user information display section 74 therebelow for displaying information on introduced users corresponding to the recommended game. When the user selects the portion having the text "See more recommended games" below the introduced user information display section 74, additional recommended games may be displayed in a list. In an embodiment, the recommended game information display section 73 may include an image corresponding to the recommended game in the left, and the name (game title) of the recommended game in the right. In an embodiment, the introduced user information display section 74 may contain information on three introduced users, wherein, for each of the introduced users, the left portion may display an image corresponding to the introduced user (e.g., an avatar image), the upper right portion may display information on the connection between the user operating the terminal device 30 and the introduced user (the example in FIG. 11 displays "a friend in game B," "a greeting mate," and "a friend in a platform"), and the lower right portion may display information on the degree of use of the recommended game by the introduced user (the example in FIG. 11 displays "←devoted!," "←deeply devoted!!," and "←started"). Further, the number of recommended games displayed in the game recommendation area 71 and the number of introduced users displayed for one recommended game may be any desirable numbers and are not limited.

The information on the connection with the introduced user displayed on the introduced user information display section 74 may be information obtained from the column "connection" in the recommended content management table 52*d*. Of the information on connections shown in FIG. 11, the connections "a friend in game B" and "a friend in a platform" may be information which is managed as "relationship" by the user-to-user relationship management table 52*a* and then has been stored in the column "connection" of the recommended content management table 52*d* in the selection process illustrated in FIG. 9. Further, of the information on connections shown in FIG. 11, the connection "a greeting mate" may be information which has likewise been set and registered in the selection process based on information managed by the communication management table 52*b*. For more specific example, a user may be stored as "a greeting mate" if the number of "greetings" stored in the communication management table 52*b* is greater than a predetermined threshold value; the user may be stored as "a chat mate" if the number of "chats" is greater than a predetermined threshold value; and the user may be stored as "a rival in game D" if the number of "battles in game D" is greater than a predetermined threshold value. Additionally, if a plurality of connections are possible candidates for the connection with the introduced user, one of them may be selected by a predetermined rule. For example, if there are a plurality of "relationships" with the introduced user, a relationship may be selected in accordance with a predetermined priority order (e.g., "a friend" precedes "a circle company" or "a friend in a communication platform"

precedes "a friend in game B (a particular game)"); if there are a plurality of possible connections based on information stored in the communication management table 52b, a connection may be selected in accordance with a predetermined priority order (e.g., "chat mate" precedes "greeting mate"); or a "relationship" stored in the user-to-user relationship management table 52a may be selected prior to a connection based on the information stored in the communication management table 52b.

The information on the degree of use by the introduced user displayed in the introduced user information display section 74 may be based on information obtained from the column "degree of use" in the recommended content management table 52d. That is, for example, if the degree of use by the introduced user is greater than a first threshold value and equal to or less than a second threshold value, the displayed information may be "←started"; if the degree of use is greater than the second threshold value and equal to or less than a third threshold value, the displayed information may be "←devoted!"; and if the degree of use is greater than the third threshold value, the displayed information may be "←deeply devoted!!." The introduced user information display section 74 may contain information on the degree of use by the introduced user in various modes, not only in the above mode. For example, the possible modes are as follows: the value of degree of use may be displayed; the image of the introduced user may be displayed differently (e.g., in different colors and sizes) in accordance with the degree of use; or the information on the connection with the introduced user may be displayed differently (e.g., in different colors and sizes) in accordance with the degree of use. Further, the introduced user information display section 74 may contain information on closeness between the user operating the terminal device 30 and the introduced user in various modes. For example, the possible modes are as follows: the value of closeness may be displayed; the image of the introduced user may be displayed differently (e.g., in different colors and sizes) in accordance with the closeness; the information on the degree of use by the introduced user may be displayed differently (e.g., in different colors and sizes) in accordance with the closeness; or the information on the connection for the introduced user may be displayed differently (e.g., in different colors and sizes) in accordance with the closeness.

At least one of the image and name of the recommended game contained in the recommended game information display section 73 may be provided with a link to a content-related screen related to the recommended game. The content-related screen may be any of various screens related to the recommended game (including various screens such as a screen for using the recommended game and a screen for introducing the recommended game); and, for example, the content-related screen may be used as a top screen from which to start the recommended game. Likewise, at least one of the image of the introduced user, the information on connection with the introduced user, and the information on the degree of use by the introduced user in the introduced user information display section 74 may be provided with a link to a user-related screen related to the introduced user. The user-related screen may be any of various screens related to the introduced user (including various screens such as a screen for displaying various information on the introduced user and a screen for performing various communication with the introduced user); and, for example, the user-related screen may be used as a profile screen of the introduced user in the communication platform. Further, the user-related screen may be dynamically changed; for example, if there is no relationship of "friend" between the user operating the terminal device 30 and the introduced user, the provided link may link to a screen for making a friend request to the introduced user; and if there is already a relationship of "friend," the provided link may link to the above described profile screen of the introduced user. If the recommended game is provided with a profile screen for the game, in addition to the profile screen of the communication platform, the provided link may link to the profile screen for the game; if the recommended game is not provided with a profile screen for the game, the provided link may link to the profile screen of the communication platform.

Further, in an embodiment, when the user operating the terminal device 30 selects the link to the content-related screen or the user-related screen, a predetermined reward (e.g., virtual currency usable in the communication platform provided by the system 10, or a game content usable in the recommended game such as a card or an item) may be provided to the user operating the terminal device 30 and the introduced user. More specifically, when receiving from the terminal device 30 a signal indicating that the above link has been selected, the system 10 may provide a reward to the user operating the terminal device 30 and the introduced user and record the provided reward on a table in the information storage unit 52 for managing user information, the table not shown in the figures. Such a reward may also be provided to only one of the user operating the terminal device 30 and the introduced user.

As shown, the user recommendation area 72 of My Page screen 70 may contain a recommended user display section 76 for displaying information on a recommended user, an introduced game information display section 78 therebelow for displaying information on introduced games corresponding to the recommended user, and a friend request button 79 captioned with "Friend Request". When the user selects the portion having the text "See more recommended users" below the introduced game display section 78, additional recommended users may be displayed in a list. In an embodiment, the recommended user information display section 76 may include an image (e.g., avatar image) corresponding to the recommended user in the left, and the name of the recommended user in the right. In an embodiment, the introduced game information display section 78 may display information on three introduced games; for each introduced game, an image corresponding to the introduced game may be displayed in the left, the name (game title) of the introduced game is displayed in the upper right, and the information on degree of use for the introduced game by the recommended user may be displayed in the lower right. Further, the number of recommended users displayed in a list in the user recommendation area 72 and the number of introduced games displayed for one recommended user may be any desirable numbers and are not limited. The information on the degree of use by the recommended user displayed in the introduced game information display section 78 may be based on information obtained from the column "degree of use" in the recommended user management table 52e. That is, as with the information on the degree of use by the introduced user displayed in the above introduced user information display section 74, for example, if the degree of use by the recommended user is greater than a first threshold value and equal to or less than a second threshold value, the displayed information may be "←started"; if the degree of use is greater than the second threshold value and equal to or less than a third threshold value, the displayed information may be "←devoted!"; and if the degree of use is greater than the third threshold value, the displayed information may be "←deeply devoted!!." The mode wherein the introduced game information display section 78 includes information on the degree of use by the introduced user are not limited to the above description and may be various, as with the information on the degree of use by the introduced user displayed on the above introduced user information display section 74.

Figure 12:
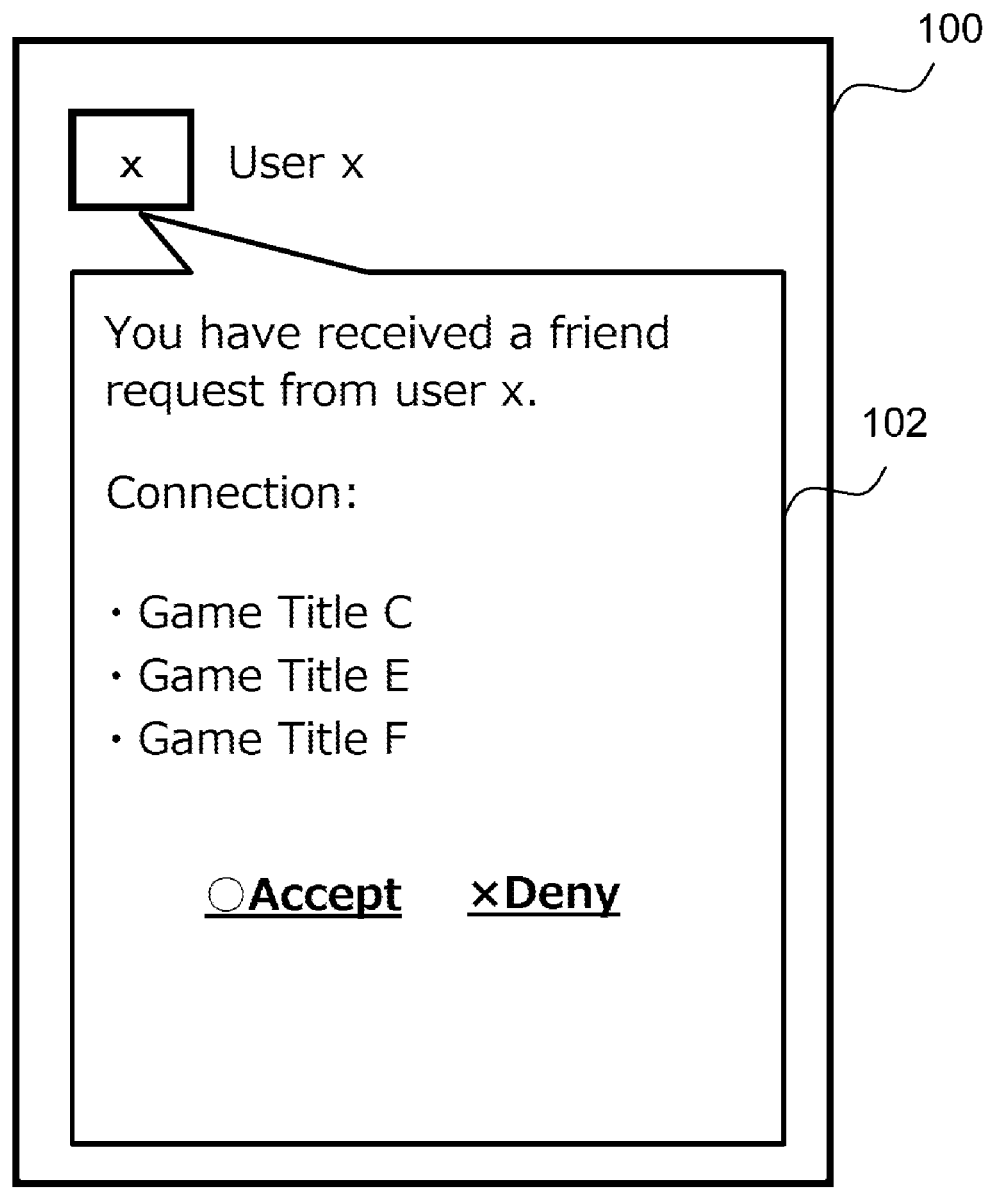
FIG. 12 is a diagram showing an example of My Message screen according to an embodiment.

In an embodiment, when the user selects the friend request button 79 in the user recommendation area 72, a friend request for the recommended user (a request for setting as a friend of the recommended user) may be made. FIG. 12 shows an example of message screen 100 (relationship request information) sent from the system 10 (relationship request information sending unit 57) to the terminal device 30 operated by the recommended user in response to a friend request for the recommended user made by the user selecting the friend request button 79. As shown, the message screen 100 may contain an image (e.g., an avatar image) and name corresponding to the user who made the friend request in the upper left corner, and a message display area 102 below the image and name. The message display area 102 may display the presence of the friend request along with information on the introduced game; when the user selects one of the portions containing the texts "○ Accept" or "X Deny," the friend request may be accepted or denied. Accordingly, through the message screen 100 containing the information on the introduced games, the user having received the friend request (recommended user) can grasp the games used by both the user who made the friend request and the recommended user and select acceptance or denial. Further, when the recommended user selects the portion containing the text "○ Accept" to accept the friend request, the relationship between the user and the recommended user may be set to "friend" (more specifically, the user-to-user relationship management table 52a may be updated).

In an embodiment, the friend request made when the friend request button 79 is selected may be a request for "a friend in a communication platform." Accordingly, other users already having a "relationship" of "a friend in a communication platform" may be excluded from the selection of a recommended user in step S108 of the selection process shown in FIG. 9. It may also be possible to make a friend request for a recommended user by selecting an image and/or a name corresponding to the recommended user in the recommended user information display section 76, in which case the friend request button 79 may not be provided. Further, in an embodiment, when the information (an image or name) on the introduced games displayed in the introduced game information display section 78 is selected, a friend request (company request) may be made for "a friend" in an corresponding "introduced game." Such a friend request may also be made through another screen (after screen transition). More specifically, when a user selects the friend request button 79 or information on an introduced game in the introduced game information display section 78, the screen may transition to, for example, a profile screen of the recommended user in an communication platform or the introduced game (that is, a link to the profile screen may be provided to the friend request button 79 or the information on the introduced game in the introduced game information display section 78) such that a corresponding friend request may be made through the profile screen. As with the recommended game information display section 73, at least one of an image or name of an introduced game in the introduced game information display section 78 may be provided with a link to the above content-related screen related to the introduced game. It may also be possible that My Page screen 70 should contain only one of the game recommendation area 71 for recommending a game and the user recommendation area 72 for recommending other users.

Figure 13:
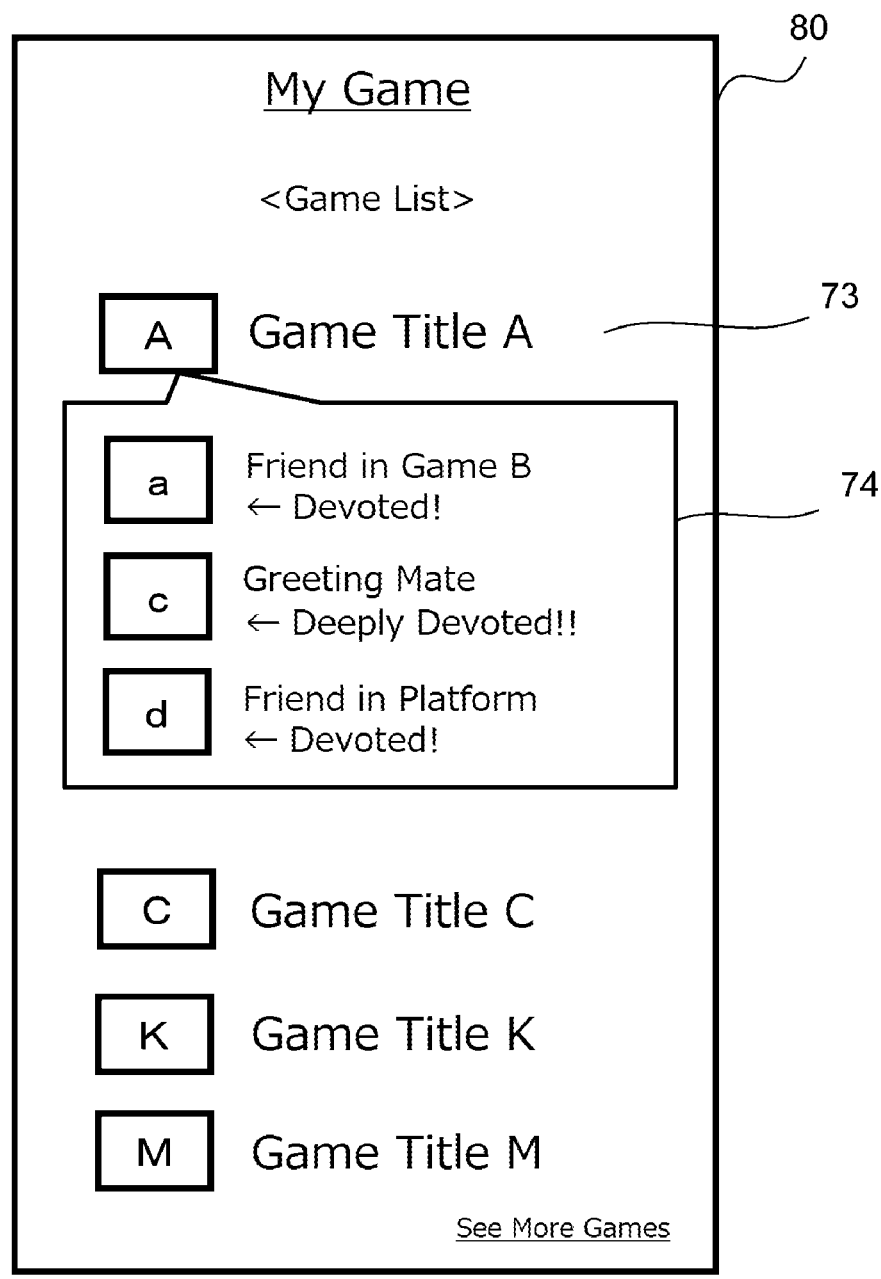
FIG. 13 is a diagram showing an example of My Game screen according to an embodiment.

FIG. 13 shows another example of My Game screen 80 containing the information on the recommended games. My Page screen 70 shown in FIG. 11 may only display, in the user recommendation area 72, games yet to be used by the user operating the terminal device 30 and may not display games already used by the user operating the terminal device 30. Meanwhile, My Game screen 80 shown in FIG. 13 may display a list of games already used by the user operating the terminal device 30; as with My Page screen 70 shown in FIG. 11, this screen may display a recommended game information display section 73 and an introduced user information display section 74 for each of the games already used by the user that are registered in the recommended content management table 52d as recommended games (game title A in the example shown in FIG. 13). Thus, My Game screen 80 may display information on the introduced user using the game already used by the user operating the terminal device 30; this may enable recommendation of games that the user can enjoy with the introduced user. In this case, the link provided to the image and name of a recommended game in the recommended game information display section 73 may link to different screens (content-related screens) depending on the degree of use of the recommended game by the user operating the terminal device 30. For example, if the degree of use by the user exceeds a predetermined threshold value, the link may link to a screen for a special event of the game; and if the degree of use by the user does not exceed a predetermined threshold value, the link may link to a normal top screen. Further, the recommended game information display section 73 may contain information on the degree of use of the recommended game by the user operating the terminal device 30 in various modes. For example, the value of the degree of use may be displayed; or the image and name of the recommended game may be displayed differently (e.g., in different colors and sizes) in accordance with the degree of use. Additionally, the degree of use of the recommended game by the user may be managed by the recommended content management table 52d For a screen like My Game screen which contains only information on the recommended game and does not contain information on the recommended user, step S202 (the step for obtaining information on the recommended user) may be skipped in performing the screen setting/display process. Further, as My Page screen 70, My Game screen 80 may contain a game recommendation area 71 for recommending games yet to be used by the user operating the terminal device 30 or a user recommendation area 72 for recommendation of other users.

Figure 14:
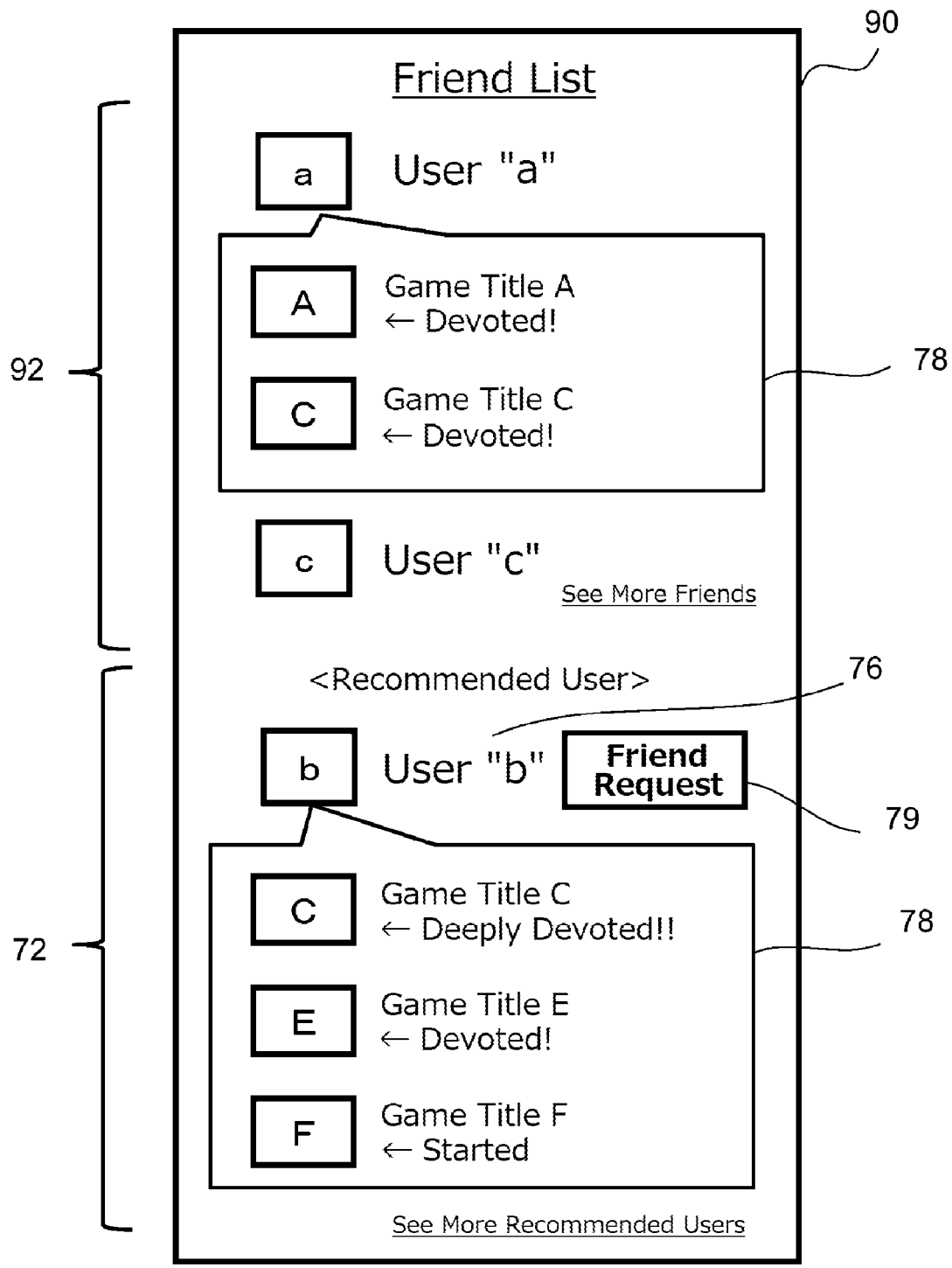
FIG. 14 is a diagram showing an example of Friend List screen according to an embodiment.

FIG. 14 shows another example of Friend List screen 90 containing the information on the recommended users. As shown, Friend List screen 90 may contain: a friend list display area 92 positioned in the upper portion of the screen and displaying a list of information on users (friend users) having a relationship of "friend" (e.g., "friend in a communication platform") with the user operating the terminal device 30; and a user recommendation area 72 positioned in the lower portion of the screen and recommending a user as in My Page screen 70 described above. As shown, the friend list display area 92 may display a list of information (images (e.g., avatar images) and names) on friend users; when the user selects the portion containing the text "See more friends" in the lower right corner, additional friend users may be displayed in a list. As shown, the same introduced game information display section 78 as in the user recommendation area 72 of My Page screen 70 described above may be displayed for each of the users (user "a" in the example shown in FIG. 14) displayed in the list and registered in the recommended user management table 52e as recommended users for the user operating the terminal device 30. Thus, Friend List screen 90 displaying a list of users already in a relationship of "friend" may display information on the introduced games so as to notify the user of the games that can be enjoyed with the users displayed in the list. Further, as My Page screen 70 described above, the user recommendation area 72 may contain the recommended user information display section 76, the introduced game information display section 78, and a friend request button 79. The user recommendation area 72 may be the same as that in My Page screen 70 described above and thus will be omitted from further detailed description. For a screen like Friend List screen which contains only information on the recommended user and does not contain information on the recommended game, step S200 (the step for obtaining information on the recommended game) may be skipped in performing the screen setting/display process. Further, Friend List screen 90 may contain the game recommendation area 71 for recommending games, as in My Page screen 70.

In the embodiment, the selection process shown in FIG. 9 may be performed at regular intervals in accordance with a predetermined schedule; but the time of performing the selection process is not limited thereto. For example, the selection process may be performed upon start of the screen setting/display process as shown in FIG. 10; and each time a display request for a screen is received, the system 10 may select the recommended games and/or the recommended users for the user operating the terminal device 30 that has made the display request for a screen containing information on the recommended games and/or the recommended users.

The system 10 according to the embodiment may select a recommended user to be recommended to a user based on the degree of use; additionally, this selection may be based on the closeness. For example, the users preferentially selected as recommended users may be, for example, other users having a high closeness and not in a relationship of "friend" with one user (or not in a relationship of "friend in a communication platform") (e.g., other users having active communication but not in a relationship of "friend," or other users in a relationship of "friend in particular games" but not in a relationship of "friend in a communication platform").

The system 10 according to an embodiment of the present invention as described above may select recommended games to be recommended to one user from a plurality of games based on the closeness between a plurality of users and the degree of use of the games (electronic contents) by the plurality of users, send the screen data of the screen containing the information specifying the recommended games to the terminal device 30 operated by the user, select recommended users (other users) to be recommended to the one user from a plurality of users based on the above degree of use, and send the screen data of the screen containing the information specifying the recommended users to the terminal device 30 operated by the one user. Thus, the system 10 can provide the user with information on recommended games based on closeness and the degree of use and provide the user with information on recommended users based on the degree of use. As a result, provision of information on recommended users may increase the amount of information that impacts the closeness between a plurality of users (e.g., information managed by the user-to-user relationship management table 52a and the communication management table 52b), and may increase the number and accuracy (e.g., fitness of preferences) of the recommended games. That is, the system 10 may more appropriately provide the users with recommendation information of contents based on use status of the contents by a plurality of users.

The system 10 according to the embodiment was described for the case of online games as electronic contents for example; and the present invention may also be applied to other electronic contents such as electronic books, video contents, and music contents. In this case, the content use management table 52c may manage information on use of contents in accordance with the types of the electronic contents.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A system for providing a plurality of electronic contents to a plurality of users each operating a respective terminal device communicatively connected to the system, the system comprising:

an information storage unit configured to store at least closeness information specifying closeness between the plurality of users and use degree information specifying degree of use of each of the plurality of electronic contents by each of the plurality of users; and one or more computer processors configured by machine-readable instructions to:

select one or more electronic contents to be recommended to one user from the plurality of electronic contents based at least on the closeness information and the use degree information;

send, to the terminal device operated by the one user, content recommendation information including information specifying the recommended electronic contents;

select one or more other users to be recommended to the one user from the plurality of users based at least on the use degree information; and send, to the terminal device operated by the one user, user recommendation information including information specifying the recommended other users, wherein the user recommendation information is sent to the terminal device as screen data of a particular screen containing the user recommendation information and enabling the one user to make a request for setting, a particular relationship with the recommended other users, the relationship impacting the closeness between the one user and the recommended other users, in addition to the recommended other users, one or more electronic contents are selected to be introduced as electronic contents used by both the one user and the recommended other users from the plurality of electronic contents, and the user recommendation information includes information specifying the introduced electronic contents.

2. The system of claim 1 wherein the system provides a communication platform for implementing a particular communication between the plurality of users, in addition to the plurality of electronic contents; and the particular screen is configured to enable the one user to make a request for setting the particular relationship with the recommended users in the communication platform.

3. The system of claim 1 wherein the particular screen is configured to enable the one user to make a request for setting the particular relationship with the recommended users in the electronic contents.

4. The system of claim 1 wherein the one or more computer processors are further configured to send, to the terminal device operated by the recommended other user, relationship request information including information specifying the one user and information specifying the introduced electronic contents, in response to a request for setting the particular relationship with the recommended other users from the one user.

5. The system of claim 1 wherein the one or more computer processors are further configured by the machine-readable instructions to select, from the plurality of users, one or more other users to be introduced as users using the recommended electronic contents, in addition to the recommended electronic contents; and, wherein the content recommendation information includes information specifying the introduced other users.

6. A method using one or more computers for providing a plurality of electronic contents to a plurality of users each operating a respective terminal device communicatively connected, the method comprising:

storing at least closeness information specifying closeness between the plurality of users and use degree information specifying degree of use of each of the plurality of electronic contents by each of the plurality of users;

selecting one or more electronic contents to be recommended to one user from the plurality of electronic contents based at least on the closeness information and the use degree information;

sending, to the terminal device operated by the one user, content recommendation information including information specifying the recommended electronic contents;

selecting one or more other users to be recommended to the one user from the plurality of users based at least on the use degree information; and sending, to the terminal device operated by the one user, user recommendation information including information specifying the recommended other users, wherein sending the user recommendation information includes sending, to the terminal device, screen data of a particular screen containing the user recommendation information and enabling the one user to make a request for setting, a particular relationship with the recommended other users, the relationship impacting the closeness between the one user and the recommended other users, in addition to the recommended other users, one or more electronic contents are selected to be introduced as electronic contents used by both the one user and the recommended other users from the plurality of electronic contents, and the user recommendation information includes information specifying the introduced electronic contents.

* * * * *